(12) United States Patent
Tabuchi et al.

(10) Patent No.: US 8,370,257 B2
(45) Date of Patent: Feb. 5, 2013

(54) PRINT SYSTEM FOR OUTPUTTING TRANSACTION STATEMENT

(75) Inventors: Kazumi Tabuchi, Osaka (JP); Ryoh Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 239 days.

(21) Appl. No.: 12/786,817

(22) Filed: May 25, 2010

(65) Prior Publication Data

US 2010/0306070 A1 Dec. 2, 2010

(30) Foreign Application Priority Data

May 26, 2009 (JP) ................................. 2009-126184

(51) Int. Cl.
*G06Q 40/00* (2012.01)
(52) U.S. Cl. ................................ 705/42; 705/28; 705/64
(58) Field of Classification Search ..................... 705/64, 705/28, 42
See application file for complete search history.

(56) References Cited

U.S. PATENT DOCUMENTS

| | | | |
|---|---|---|---|
| 5,970,218 A | 10/1999 | Mullin et al. | |
| 6,795,205 B1 * | 9/2004 | Gacek | 358/1.15 |
| 2005/0281405 A1 * | 12/2005 | Uchikawa et al. | 380/51 |
| 2006/0221375 A1 * | 10/2006 | Nagarajan et al. | 358/1.14 |
| 2007/0229873 A1 * | 10/2007 | Kato | 358/1.14 |
| 2007/0282995 A1 * | 12/2007 | Mizuno et al. | 709/223 |
| 2010/0191633 A1 * | 7/2010 | Nuzum et al. | 705/35 |

FOREIGN PATENT DOCUMENTS

| | | |
|---|---|---|
| JP | 11-031061 A | 2/1999 |
| JP | 2006-155142 A | 6/2006 |
| JP | 2007-148658 A | 6/2007 |
| JP | 2007-249271 A | 9/2007 |
| JP | 2008-200930 A | 9/2008 |

\* cited by examiner

*Primary Examiner* — Elaine Gort
(74) *Attorney, Agent, or Firm* — Birch, Stewart, Kolasch & Birch, LLP

(57) ABSTRACT

A print system allowing a user to obtain a transaction statement in a safe and easy manner is provided. For this purpose, a print system includes: a banking terminal; and a digital multi-function peripheral performing data communication with a Web server having transaction statement data and PIN code stored in association with each other, through an external network and an in-store network. The banking terminal is adapted to include an operation panel receiving a request from a user for an output of a transaction statement, and a PIN code generating unit and a receipt issuing unit for generating and outputting a PIN code in response to the received request. The digital multi-function peripheral is adapted to include an operation panel receiving the PIN code input by a user operation, a control unit obtaining transaction statement data corresponding to the received PIN code from the Web server, and a printer unit outputting a transaction statement based on the obtained transaction statement data.

13 Claims, 11 Drawing Sheets

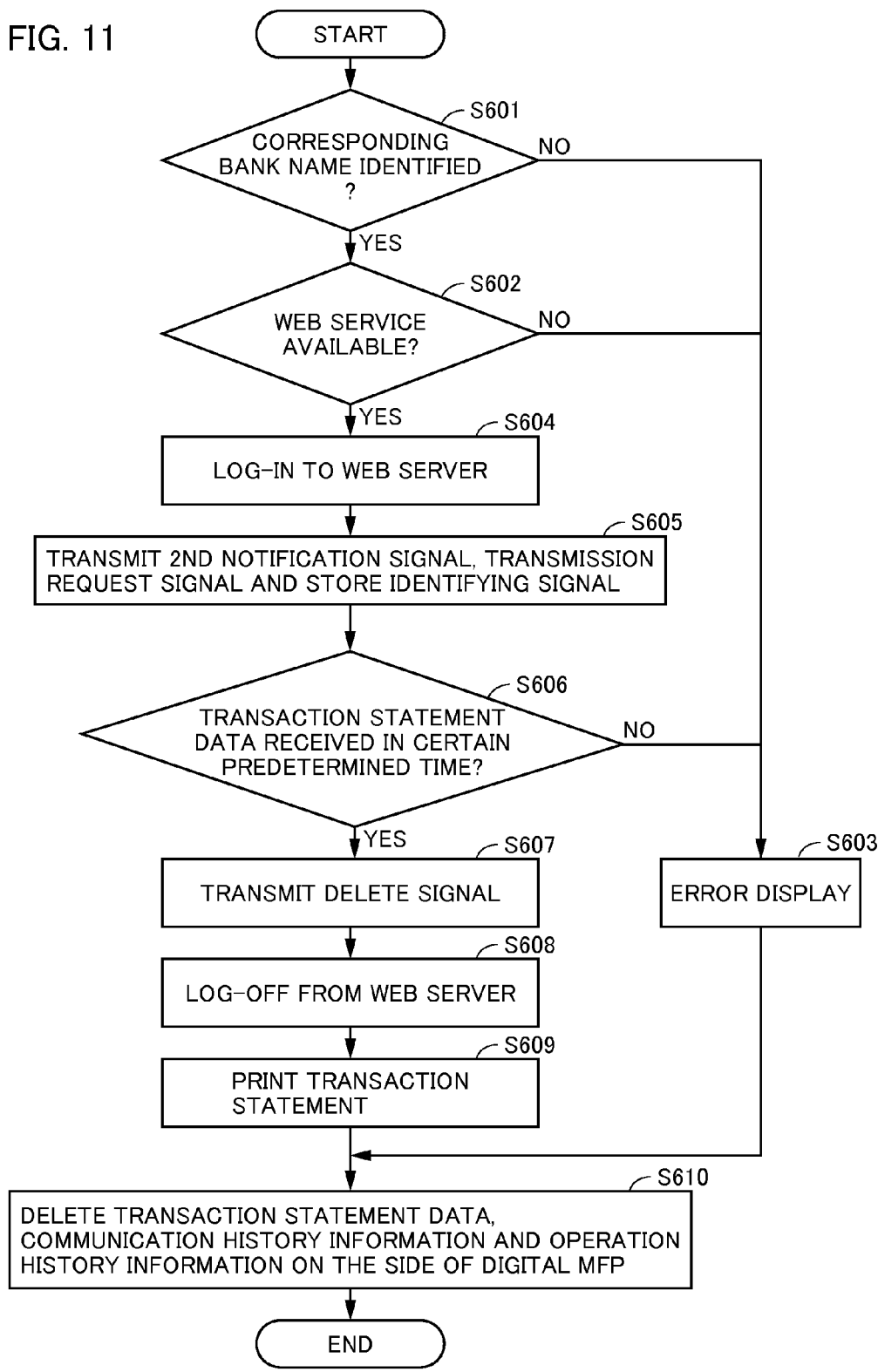

PRINT SYSTEM FOR OUTPUTTING TRANSACTION STATEMENT

CROSS-REFERENCE TO RELATED APPLICATION

This nonprovisional application claims priority under 35 U.S.C. §119(a) on Patent Application No. 2009-126184 filed in Japan on May 26, 2009, the entire contents of which are hereby incorporated by reference.

BACKGROUND OF THE INVENTION

1. Field of the Invention

The present invention relates to a print system including a banking terminal, a server and a terminal and, more specifically, to a technique enabling a user to obtain information related to bank transaction in a safe and easy manner.

2. Description of the Background Art

Recently, because of vigorous store developments by many retailers, we find many shops and stores such as convenience stores in the neighborhood. Among such stores, some are tied-up with a plurality of banks and have a banking terminal (ATM: Automated-Teller Machine) installed in the store to provide bank transactions services including deposit, withdrawal and remittance on behalf of the banks. Because of such services, it becomes possible for bank customers to make bank transactions conveniently, without the necessity to go off to branches of financial institutions. Positive use of such services is also advantageous to tied-up banks, since the number of banking terminals each bank must install can be reduced and, hence, maintenance cost of banking terminals can be reduced.

Some stores also provide copying and facsimile transmission services, by installing an image forming apparatus such as a digital multi-function peripheral (MFP) in the store. Some image forming apparatuses are connected to a network and capable of data communication with an external apparatus. By way of example, Japanese Patent Laying-Open No. 2008-200930 (hereinafter referred to as "'930 application") discloses a system in which user authentication is performed and data stored in a terminal on the network is printed simply by an operation of a printer on the network.

Most of the banking terminal installed in stores support only the transactions with cash cards, and do not allow updating of one's passbook. Therefore, it is the case that though a user of the above-described services can obtain a receipt including the result of each transaction, he/she cannot obtain a transaction statement including information of a plurality of transaction results for a prescribed time period. Therefore, a bank customer must go off to any of a decreasing number of branches of the financial institution, to get the transaction statement. This is rather inconvenient.

As a possible solution to the above-described problem, it may be possible to use a transaction statement confirmation service on the Internet. However, because of security concerns, many users are still hesitant to transmit/receive individual information through the Internet. The technique disclosed in '930 application does not discuss any method to solve the above-described problem.

SUMMARY OF THE INVENTION

An object of the present invention is to provide a print system that allows obtaining a transaction statement in a safe and easy manner.

According to an aspect, the present invention provides a print system, including a financial service terminal and an output apparatus performing data communication through a network with an external apparatus storing a PIN code and transaction statement data indicating financial transaction history information with a prescribed financial institution in association with each other; wherein the financial service terminal includes a first receiving unit receiving a request by a user for an output of a transaction statement, and a first output unit responsive to the received request for generating and outputting the PIN code; and the output apparatus includes a second receiving unit receiving the PIN code input by an operation by the user, a data obtaining unit obtaining, from the external apparatus, the transaction statement data corresponding to the received PIN code, and a second output unit outputting the transaction statement based on the obtained transaction statement data.

As described above, the user can obtain the desired transaction statement by inputting the PIN code output from the financial service terminal to the output apparatus. Since only the user who obtained the PIN code can get the transaction statement, a third party cannot obtain the transaction statement. Thus, leakage of individual information can be prevented. As a result, the user can obtain the transaction statement in a safe and easy manner.

Preferably, the financial service terminal further includes an authentication unit performing an authentication process for determining whether or not the user is an authorized user; and the first output unit generates and outputs the PIN code when the user is determined to be an authorized user by the authentication unit. Thus, it becomes possible to reliably prevent a third party, who is not an authorized user, from obtaining the PIN code and, hence, leakage of individual information can reliably be prevented.

More preferably, the first output unit outputs address information of the external apparatus together with the PIN code. Thus, it becomes easier for the user to obtain the transaction statement data corresponding to the received PIN code.

More preferably, the first output unit generates the PIN code to include an identifier for identifying a financial institution as a partner. Thus, it becomes easier for the output apparatus to obtain the transaction statement data corresponding to the received PIN code.

More preferably, the output apparatus further includes a confirming unit confirming, at every certain predetermined time interval, information presented by the external apparatus indicating whether or not the apparatus is in a state ready to provide the transaction statement data, and a storage unit storing the confirmed information. Therefore, it is possible on the side of the output apparatus to confirm that the external apparatus is in a status not ready to provide the transaction statement data and, hence, wasteful communication can be prevented.

More preferably, the output apparatus further includes a communication prohibiting unit prohibiting data communication with the external apparatus, when the external apparatus presents information indicating that the apparatus is in a state not ready to provide the transaction statement data. Thus, wasteful communication can more reliably be prevented.

More preferably, the first output unit includes a recording medium output unit outputting a recording medium having the PIN code recorded thereon; and the financial service terminal further includes a first detecting unit detecting whether or not the recording medium is taken out, and an alarm unit setting off an alarm when it is detected by the first detecting unit that the recording medium is not taken out. This reliably prevents the user from leaving behind the recording medium and, hence, more reliably prevents a third party from obtaining the transaction statement. Thus, leakage of individual information can more reliably be prevented.

More preferably, the financial service terminal further includes a retracting unit retracting the recording medium to a predetermined storage area, if a certain predetermined time period passes after output of the recording medium and it is detected by the first detecting unit that the recording medium is not taken out. Provision of such a retracting unit more reliably prevents a third party from obtaining the transaction statement. Thus, leakage of individual information can more reliably be prevented.

More preferably, the financial service terminal further includes a second detecting unit detecting an amount of the recording medium stored in the storage area; and the first receiving unit includes a reception inhibiting unit inhibiting reception of a request for an output of a transaction statement, if it is detected by the second detecting unit that the storage area is full of the recording medium. This prevents any trouble on the financial service terminal and improves user convenience.

More preferably, the financial service terminal further includes an error notification unit notifying an administrator of the financial service terminal of an error, if it is detected by the second detecting unit that the storage area is full of the recording medium. Since occurrence of an error is notified in this manner, an administrator can more quickly recognize and handle the error. Thus, the time period in which the financial service terminal is stopped because of the trouble can be reduced.

More preferably, the output apparatus further includes a deleting unit deleting, after outputting the transaction statement, the obtained transaction statement data and operation history information including the input PIN code. Thus, it is possible to prevent the transaction statement data and the operation history information from being kept stored and, leakage of individual information can more reliably be prevented.

More preferably, the first output unit generates the PIN code to include a number known to the user and difficult for a third party to confirm, and outputs the PIN code with a portion corresponding to the number hidden. Therefore, even if the user should lose the receipt before obtaining the transaction statement, a third party cannot use the PIN code and, therefore, he/she cannot obtain the transaction statement. Thus, leakage of individual information can more reliably be prevented.

More preferably, the output apparatus further includes a prohibiting unit prohibiting output of the transaction statement by the second output unit, when a certain predetermined time passes after the first receiving unit received a request for an output of the transaction statement. Setting the time limit for the output of transaction statement more reliably prevents a third party from obtaining the transaction statement. Thus, leakage of individual information can more reliably be prevented.

More preferably, the output apparatus further includes a mounting unit on which a data protection device for protecting data is detachably mounted, a determining unit determining whether or not the data protection device is mounted on the mounting unit, and an output prohibiting unit prohibiting output of the transaction statement by the second output unit, when it is determined by the determining unit that the data protection device is not mounted on the mounting unit. Thus, output of transaction statement with the data in an unprotected state can be prevented. Thus, leakage of individual information can more reliably be prevented.

More preferably, the financial service terminal further includes a first store storage unit storing first store identifying information identifying a store in which the financial service terminal is installed; the output apparatus further includes a second store storage unit storing second store identifying information identifying a store in which the output apparatus is installed; and the data obtaining unit obtains the transaction statement data corresponding to the received PIN code from the external apparatus, only when the first store identifying information matches the second store identifying information. Thus, the transaction statement data can reliably be protected, and leakage of individual information can more reliably be prevented.

According to the present invention, it is possible for the user to obtain the desired transaction statement by inputting the PIN code output from the financial service terminal to the output apparatus. Only the user who obtained the PIN code can get the transaction statement and, hence, it is possible to prevent a third party from getting the transaction statement and to prevent leakage of individual information. As a result, the user can obtain the transaction statement in a safe and easy manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flowchart representing a control structure of a program for realizing a transaction statement printing process in accordance with a modification.

DESCRIPTION OF THE PREFERRED EMBODIMENTS

Figure 1:
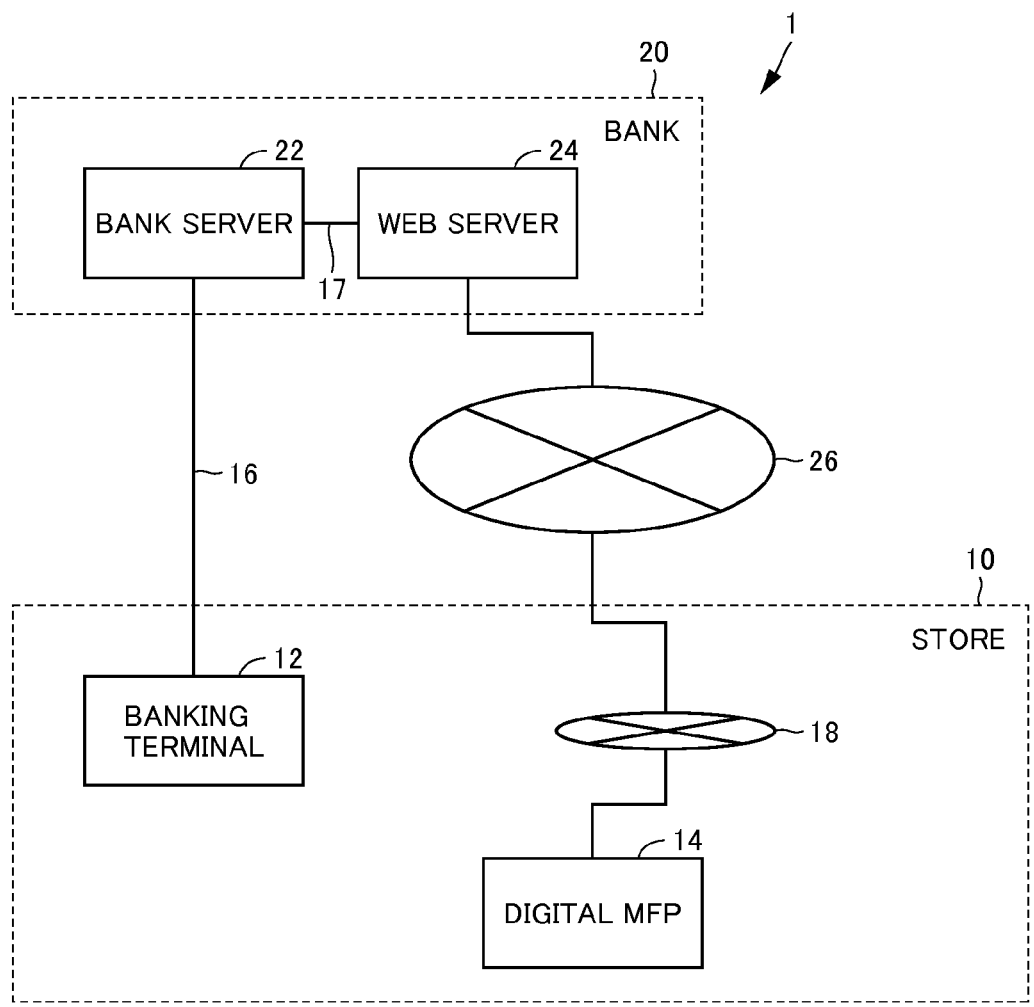
FIG. 1 shows a configuration of a print system in accordance with an embodiment of the present invention.

In the following description and in the drawings, the same components are denoted by the same reference characters and same names. Their functions are also the same. Therefore, detailed description thereof will not be repeated.

[Print System 1]

Referring to FIG. 1, print system 1 includes a banking terminal 12 and a digital multi-function peripheral 14 installed in a store 10 such as a convenience store or a super market, and a bank server 22 and a Web server 24 installed in a bank 20.

Banking terminal 12 is an automated teller machine (ATM). Banking terminal 12 is connected to bank server 22 through a dedicated line 16. A user of banking terminal 12 can make various bank transactions including deposit, withdrawal, confirmation of balance and remittance, with bank server 22.

Digital multi-function peripheral 14 provides various services including copy service and facsimile service, for the customers of store 10. Digital multi-function peripheral 14 is connected through an in-store network 18 and an external network 26 to Web server 24.

Bank server 22 is a server operated by an administrator in bank 20, for managing bank transactions with customers of bank 20. Bank server 22 is connected to Web server 24 through a dedicated line 17. Bank server 22 provides various Web services including internet banking service, for users of external apparatuses on external network 26, through Web server 24 connected to external network 26.

<Hardware Configuration>

[Banking Terminal 12]

Figure 2:
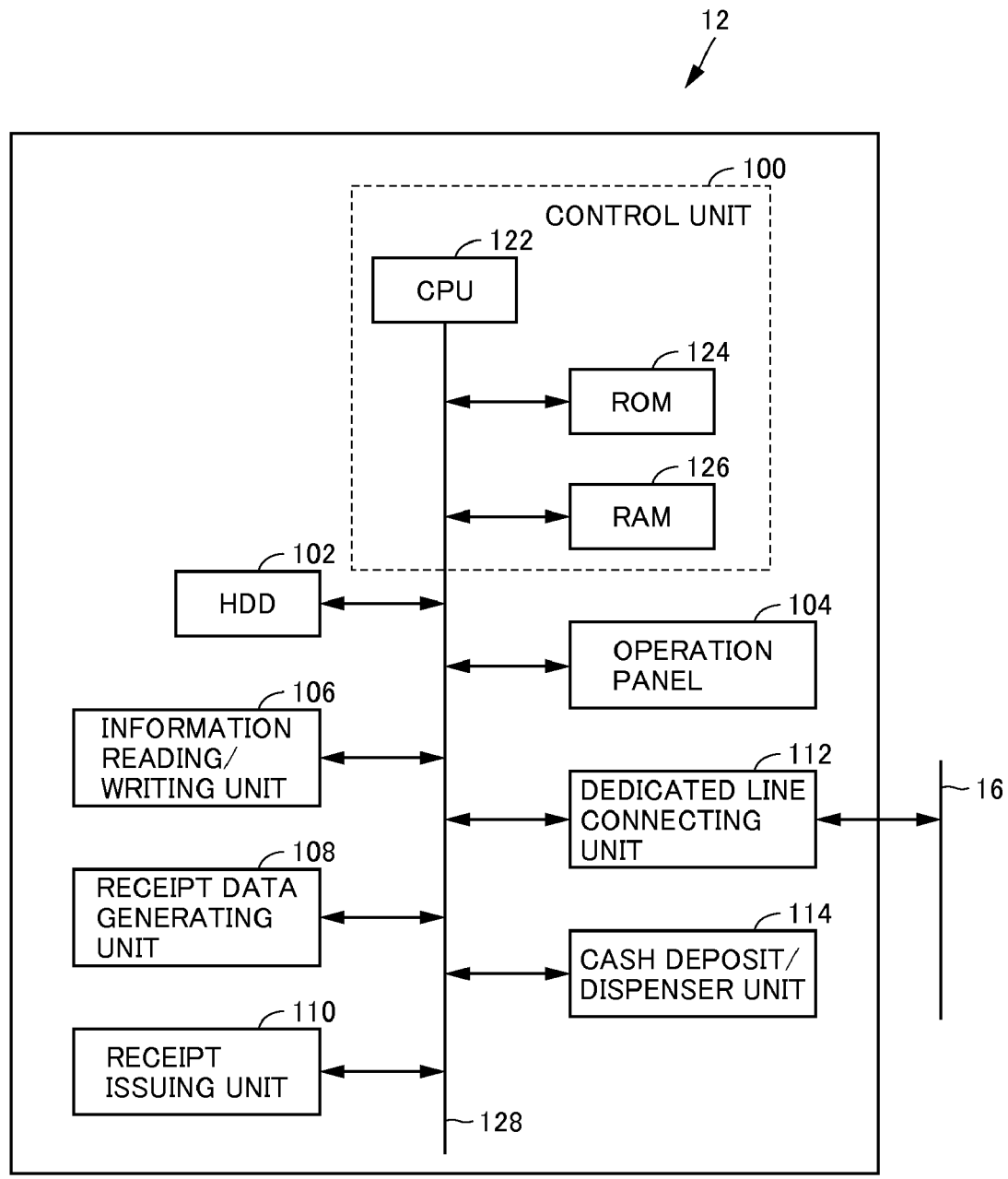
FIG. 2 is a block diagram showing a configuration of a banking terminal.

Referring to FIG. 2, banking terminal 12 includes a control unit 100, an HDD (Hard Disk Drive) 102, an operation panel 104, an information reading/writing unit 106, a receipt data generating unit 108, a receipt issuing unit 110, a dedicated line connecting unit 112 and a cash deposit/dispenser unit 114.

Control unit 100 is substantially a computer, including a CPU (Central Processing Unit) 122, an ROM (Read-Only Memory) 124 and an RAM (Random Access Memory) 126. CPU 122 is connected to a bus line 128, and to bus line 128, ROM 124 and RAM 126 are electrically connected. CPU 122 executes operations of various parts of banking terminal 12 and desired processes such as communication with bank server 22, by executing various computer programs in accordance with instructions from bank server 22, operation panel 104 or the like. The various computer programs mentioned above are stored in advance in ROM 124 or HDD 102, and at the time of executing a desired process, read from ROM 124 or HDD 102 and transferred to RAM 126. CPU 122 reads and interprets a program instruction from an address in RAM 126 designated by a value stored in a register referred to as a program counter, not shown, in CPU 122. Further, CPU 122 reads data necessary for operation from an address designated by the read instruction, and executes the operation corresponding to the instruction on the data. The result of execution is also stored in the address designated by the instruction in RAM 126, HDD 102 or the register in CPU 122.

To bus line 128, HDD 102, operation panel 104, information reading/writing unit 106, receipt data generating unit 108, receipt issuing unit 110, dedicated line connecting unit 112 and cash deposit/dispenser unit 114 are electrically connected.

HDD 102 stores various data including image data to have various images displayed on operation panel 104. HDD 102 also stores a computer program for realizing the receipt printing process, which will be described later.

Operation panel 104 provides a user-interactive operation interface, formed by superposing a liquid crystal display and a touch panel. In the operation interface, the liquid crystal display displays an image representing various pieces of information such as states of various processes. By way of example, the liquid crystal display displays a menu image as an initial image. The menu image includes various menu buttons allowing the user to select a desired item from various bank transactions including deposit, withdrawal and remittance, and a "transaction statement" button for requesting printing of transaction statement for a desired period. The touch panel receives pieces of information of user instruction related to various processes, such as transaction information including transaction amount and account number, the desired period for the transaction statement and personal identification number, and outputs a control signal in accordance with the information to control unit 100.

Information reading/writing unit 106 includes a cash card reader/writer including a card insertion slot. The cash card reader/writer performs a process for reading customer information from a cash card inserted to the card insertion slot, and a process of writing information indicating result of bank transaction to the cash card. The cash card mentioned above includes a magnetic stripe or an IC chip for recording the customer information and the information related to the result of bank transaction.

Receipt data generating unit 108 is actually realized by a program executed by control unit 100. Receipt data generating unit 108 generates receipt data in synchronization with execution of various bank transactions through banking terminal 12. The receipt data refers to the image data for printing, including information related to the result of bank transaction that is being executed, such as date and time of transaction, transaction amount and balance after transaction. Receiving a first notification signal including PIN code information and a completion signal indicating that registration of transaction statement data is completed, from bank server 22, receipt data generating unit 108 generates the image data for printing including the notified PIN code information, and adds the generated image data for printing to receipt data. Here, the transaction statement data represents image data for printing including all pieces of information related to result of bank transactions in the desired period input from operation panel 104 of banking terminal 12. The PIN code refers to a series of characters including numerals and the like, necessary for printing the transaction statement, based on the transaction statement data. The PIN code includes an identifier for identifying the bank 20 of account.

Receipt issuing unit 110 is a receipt printer commonly used in the field of art. Receipt issuing unit 110 includes a driving unit for rotating rolled paper, and a printing unit for printing an image based on the receipt data on the roll paper and thereby issuing the receipt (all not shown).

Cash deposit/dispenser unit 114 includes a cash deposit/dispenser slot (not shown). The user disposes/withdraws cash through the cash deposit/dispenser slot. Cash deposit/dispenser unit 114 counts the input cash amount, and notifies the counted result of control unit 100.

Dedicated line connecting unit 112 provides an interface to dedicated line 16. Banking terminal 12 performs data communication with bank server 22 connected to dedicated line 16, through dedicated line connecting unit 112.

Through the operations of various components described above, banking terminal 12 performs various bank transactions with bank server 22, in accordance with an instruction by an input operation by the user through operation panel 104.

[Digital Multi-Function Peripheral]

Figure 3:
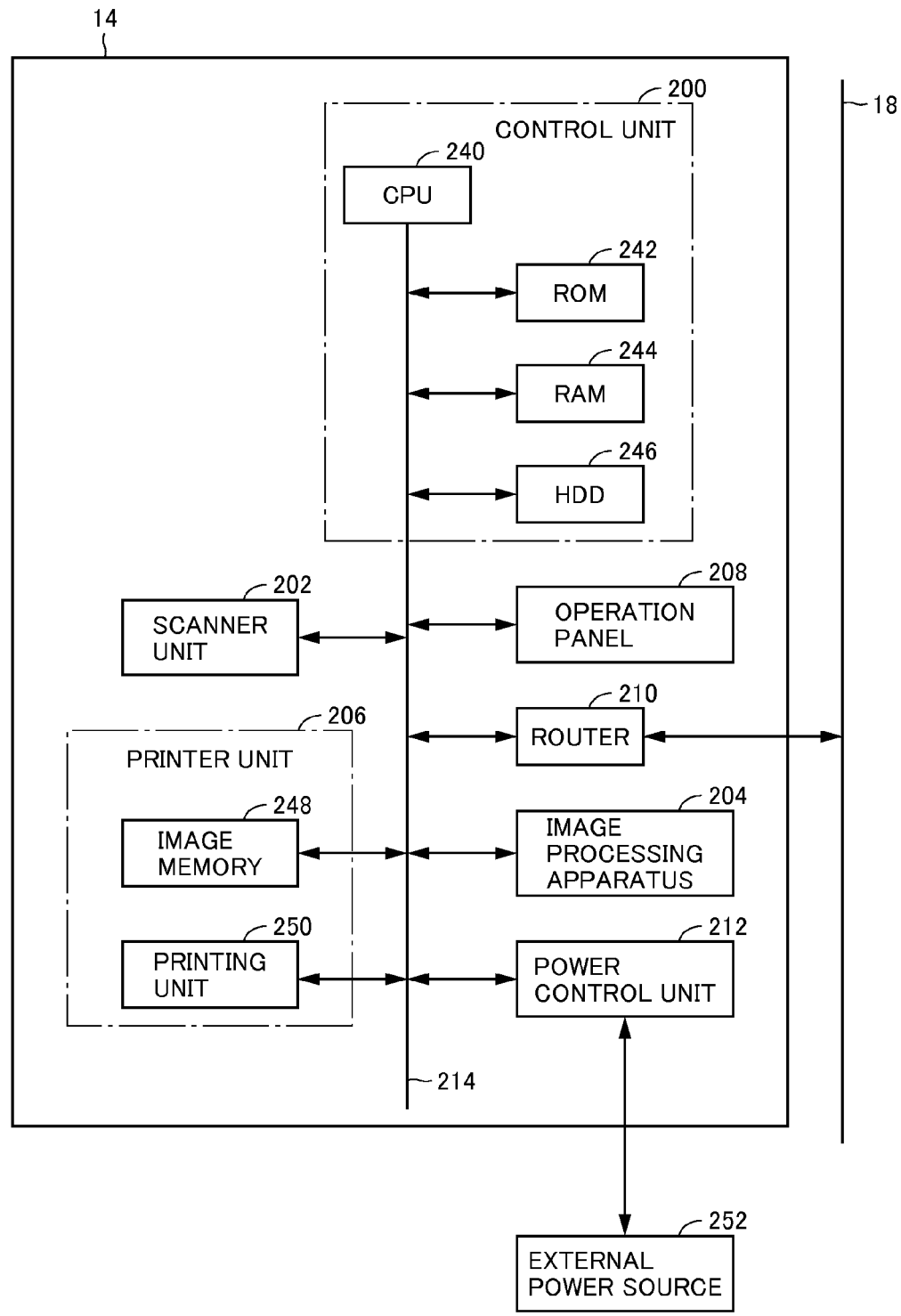
FIG. 3 is a block diagram showing a configuration of a digital multi-function peripheral.

Referring to FIG. 3, digital multi-function peripheral 14 includes a control unit 200, a scanner unit 202, an image processing apparatus 204, a printer unit 206, an operation panel 208, a router 210 and a power control unit 212.

Control unit 200 is substantially a computer, including a CPU 240, an ROM 242, an RAM 244 and an HDD 246. CPU 240 is connected to a bus line 214, and to bus line 214, ROM 242, RAM 244 and HDD 246 are electrically connected. CPU 240 executes operations of various parts of digital multi-function peripheral 14 and desired processes such as communication with an external apparatus such as Web server 24, by executing various computer programs in accordance with instructions from operation panel 208 or the like. Operations of CPU 240, ROM 242, RAM 244 and HDD 246 at the time of execution of various computer programs mentioned above are similar to the operations of CPU 122, ROM 124, RAM 126 and HDD 102 of banking terminal 12 described above.

In the present embodiment, HDD 246 stores a computer program for realizing the transaction statement printing process, which will be described later. HDD 246 also stores data of partner banks list. The data of partner banks list stores a plurality of identifiers, name of partner bank corresponding to each identifier, and information as to whether the bank corresponding to each identifier is ready to offer Web service, that is, whether or not Web server 24 is in a state ready to provide the transaction statement data (hereinafter also referred to as "provision information"), in association with each other. Digital multi-function peripheral 14 updates the provision information mentioned above at every predetermined time interval. Specifically, control unit 200 of digital multi-function peripheral 14 communicates with Web servers 24 of partner banks 20 whose names are stored in the data of partner banks list and confirms status indicated by Web servers 24 at every predetermined time interval. Here, the status refers to the information indicating the provision information mentioned above. By way of example, if the control unit of a Web server 24 indicates a status that Web service will be stopped for a long period, control unit 200 updates the provision information of corresponding bank 20 to a piece of information indicating that Web service is unavailable.

To bus line 214, scanner unit 202, image processing apparatus 204, a printer unit 206, an operation panel 208, a router 210 and a power control unit 212 are electrically connected.

Scanner unit 202 includes a document detection sensor and a CCD (Charge Coupled Device) line sensor (both not shown). When an original document is placed on a platen (not shown) manually by a user or by an automatic document feeder (not shown) for copying or scanning the original document, a light source (not shown) emits a light beam to the surface of original image of the document, and the document detection sensor forms a reflected optical image obtained by the irradiation on the CCD line sensor. The CCD line sensor performs successive photo-electric conversion of the formed reflected optical image to image data, and outputs it to image processing apparatus 204.

Image processing apparatus 204 includes an MPU (Micro Processing Unit, not shown). Image processing apparatus 204 performs various image processing such as tone reproduction process, on the image data input from scanner unit 202 or an external apparatus such as Web server 24, and outputs the data to printer unit 206.

Printer unit 206 includes an image memory 248 and a printing unit 250. Image memory 248 includes an RAM, and it temporarily stores image data on page by page basis. Image memory 248 temporarily stores, for example, image data for printing input from image processing apparatus 204 to be transmitted to printing unit 250, in accordance with an instruction from control unit 200 or the like, on page by page basis. Then, in synchronization with image formation by printing unit 250, it outputs the stored image data for printing to printing unit 250. Printing unit 250 includes a photoreceptor drum, a charger, an LSU (Laser Scanning Unit), a developer, a transfer device, a cleaning device and a fixing device (all not shown), and a toner cartridge detachably attached to digital multi-function peripheral 14. Printing unit 250 further includes a manual paper feed tray, and first and second paper feed trays (all not shown) detachably attached to digital multi-function peripheral 14. These paper feed trays are arranged to be positioned vertically from the top in this order, and hold sheets of recording paper and feed the sheets of recording paper to the paper feeding unit (not shown). The manual paper feed tray is for the user to manually place a desired sheet of recording paper, and the first and second paper feed trays are to hold sheets of recording paper of different sizes. Printing unit 250 prints, in accordance with an instruction from control unit 200 or the like, an image based on the image data for printing transmitted from image memory 248 on the sheet of recording paper fed through the paper feeding unit from any of the paper feed trays described above.

Operation panel 208 includes a power button for inputting a power-on instruction and a power-off instruction, and various operation buttons such as a print key for requesting start of a printing process. Operation panel 208 is again formed by superposing a liquid crystal display and a touch panel, and provides a user-interactive operation interface. In the operation interface, the liquid crystal display displays an image representing various pieces of information such as the state of digital multi-function peripheral 14 and states of various processes. By way of example, the liquid crystal display displays a service menu image as an initial image. The service menu image includes various service menu buttons allowing the user to select a desired item from various services that can be provided by digital multi-function peripheral 14. The service menu buttons include a "copy" button for selecting the copy service, and a "get transaction statement" button for selecting the print service of transaction statement. The touch panel receives pieces of information of user instruction related to various processes, such as the number of copies and the PIN code, and outputs a control signal in accordance with the information to control unit 200 or the MPU of image processing apparatus 204.

Router 210 provides an interface with in-store network 18. Digital multi-function peripheral 14 performs data communication with an external apparatus on in-store network 18 and an external apparatus such as Web server 24 on external network 26 connected to in-store network 18, through router 210.

Power control unit 212 is electrically connected to external power source 252. Power control unit 212 obtains electric power necessary for operations of various parts of digital multi-function peripheral 14 from an external power source 252, and supplies the obtained electric power to various parts of digital multi-function peripheral 14.

Through the operations of various parts described above, in accordance with an instruction by an input operation of the user through operation panel 208, digital multi-function peripheral 14 provides various services including copy service of reading an original image and printing an image on a sheet of recording paper, a facsimile service of reading an original image and transmitting image data to an external apparatus, and a transaction statement printing service.

[Bank Server 22]

Figure 4:
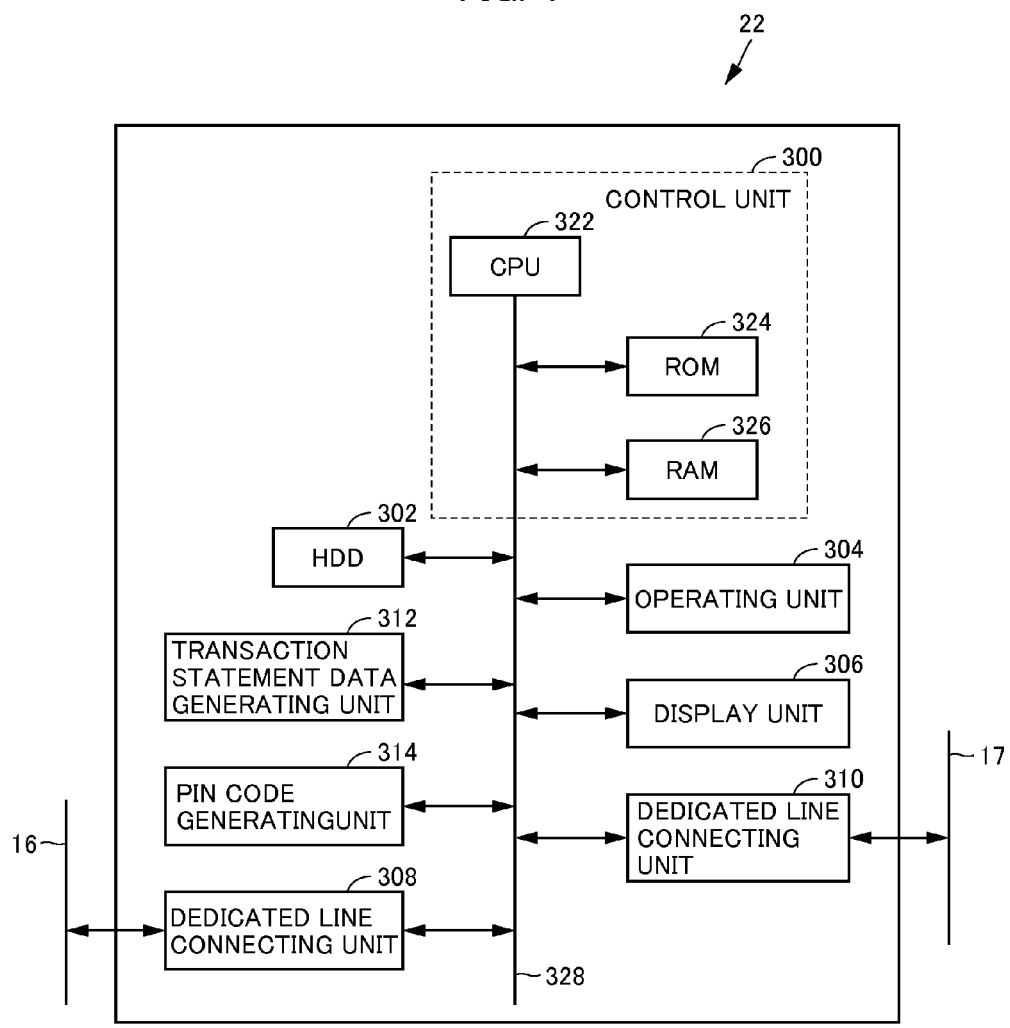
FIG. 4 is a block diagram showing a configuration of a bank server.

Referring to FIG. 4, bank server 22 includes a control unit 300, an HDD 302, an operating unit 304, a display unit 306, dedicated line connecting units 308 and 310, a transaction statement data generating unit 312 and a PIN code generating unit 314.

Control unit 300 is substantially a computer, including a CPU 322, an ROM 324 and an RAM 326. CPU 322 is connected to a bus line 328, and to bus line 328, ROM 324 and RAM 326 are electrically connected. CPU 322 executes operations of various parts of bank server 22 and desired processes such as communication with an external apparatus, by executing various computer programs in accordance with instructions from an external apparatus such as banking terminal 12 or Web server 24, operating unit 304 or the like. Operations of CPU 322, ROM 324, RAM 326 and HDD 302 at the time of execution of various computer programs mentioned above are similar to the operations of CPU 122, ROM 124, RAM 126 and HDD 102 of banking terminal 12 described above.

To bus line 328, HDD 302, operating unit 304, display unit 306, dedicated line connecting units 308 and 310, transaction statement data generating unit 312, and PIN code generating unit 314 are electrically connected.

HDD 302 stores various data including image data for displaying various images on display unit 306. HDD 302 also stores a computer program for realizing the transaction statement data registration process, which will be described later. HDD 302 further stores a database including customer information, personal identification number and transaction statement information. Here, the customer information refers to information related to a customer including name of the customer, account number and contact information such as a telephone number. The personal identification number refers to a number used in an authentication process of determining whether or not a user who is to make a bank transaction is an authorized user having pre-registered customer information, which may, for example, be a series of characters consisting only of numerals. The transaction statement information refers to information representing results of all bank transactions made to date at a counter of bank 20, at banking terminal 12 or the like.

In the authentication process described above, banking terminal 12 looks up to a database stored in HDD 302, to compare the customer information read from the cash card and the personal identification number input by the user. If the customer information matches the personal identification number, the user is determined to be an authorized user. If the customer information does not match the personal identification number, the user is determined not to be an authorized user but, for example, a third party ill-intentioned to make unauthorized bank transaction.

Operating unit 304 is an input device including a keyboard and the like allowing various inputs and character inputs in accordance with an instruction of an administrator. Display unit 306 is a monitor implemented, for example, by a liquid crystal display, for displaying results of processing of bank server 22. Operating unit 304 and display unit 306 are connected to bus line 328 through an interface (not shown).

Dedicated line connecting unit 308 provides an interface with dedicated line 16. Bank server 22 performs data communication with banking terminal 12 connected to dedicated line 16 through dedicated line connecting unit 308. Dedicated line connecting unit 310 provides an interface with a dedicated line 17. Bank server 22 performs data communication with Web server 24 connected to dedicated line 17 through dedicated line connecting unit 310.

Transaction statement data generating unit 312 is actually realized by a program executed by control unit 300. When bank server 22 receives a request signal requesting notification of PIN code and generation of transaction statement data and an authentication signal indicating that the user is an authorized user from banking terminal 12, transaction statement data generating unit 312 looks up to the database stored in HDD 302 and generates transaction statement data based on the transaction statement information.

PIN code generating unit 314 is actually realized by a program executed by control unit 300. PIN code generating unit 314 generates PIN code in synchronization with generation of transaction statement data by transaction statement data generating unit 312.

A power source (not shown) is connected to various parts of bank server 22, and electric power is supplied from the power source, so that various parts of bank server 22 operate.

[Web Sever 24]

Figure 5:
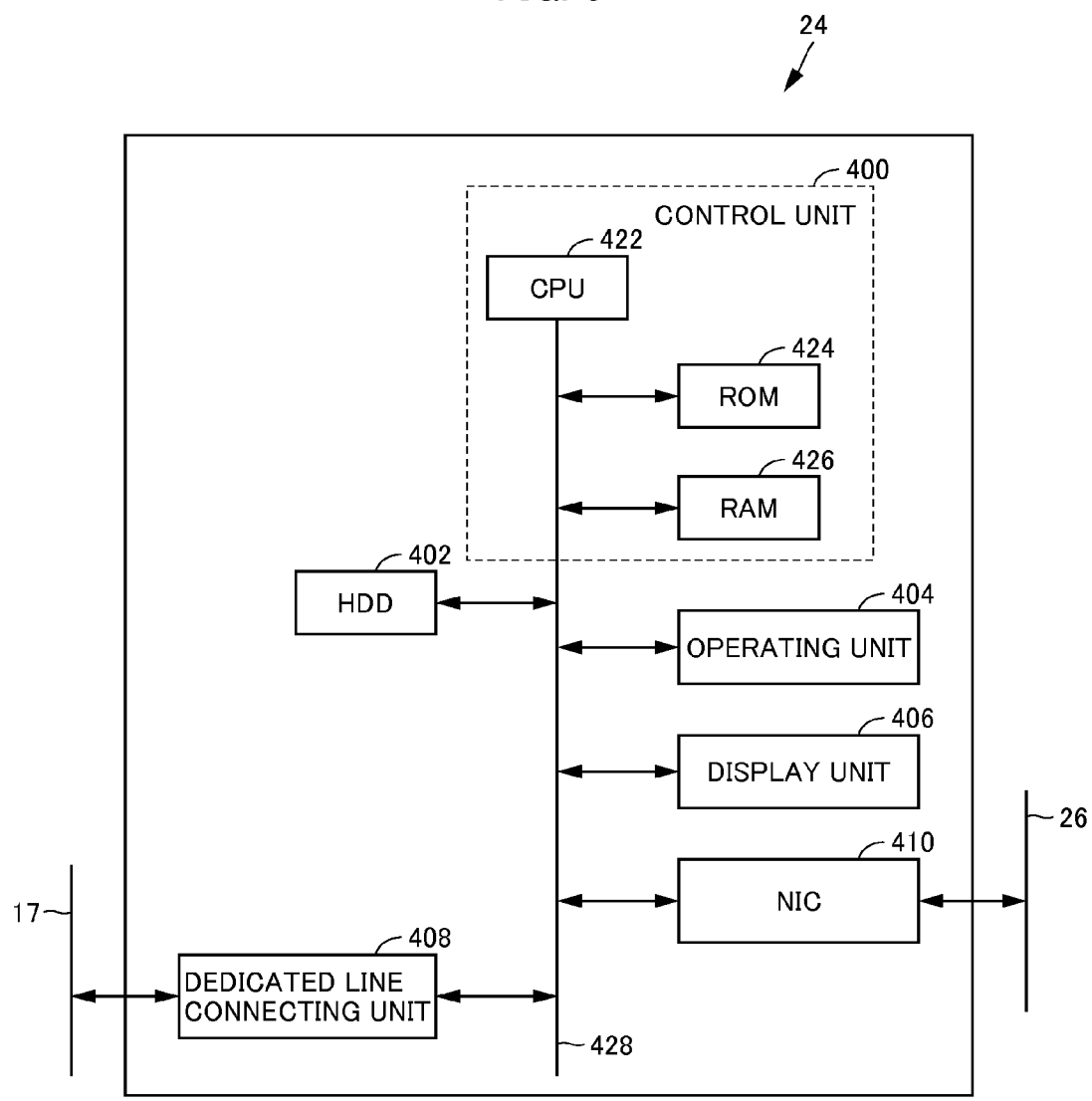
FIG. 5 is a block diagram showing a configuration of a Web server.

Referring to FIG. 5, Web server 24 includes a control unit 400, an HDD 402, an operating unit 404, a display unit 406, a dedicated line connecting unit 408 and an NIC (Network Interface Card) 410.

Control unit 400 is substantially a computer, including a CPU 422, an ROM 424 and an RAM 426. CPU 422 is connected to a bus line 428, and to bus line 428, ROM 424 and RAM 426 are electrically connected. CPU 422 executes operations of various parts of Web server 24 and desired processes such as communication with an external apparatus, by executing various computer programs in accordance with instructions from an external apparatus such as digital multi-function peripheral 14 and bank server 22, operating unit 404 or the like. Operations of CPU 422, ROM 424, RAM 426 and HDD 402 at the time of execution of various computer programs mentioned above are similar to the operations of CPU 122, ROM 124, RAM 126 and HDD 102 of banking terminal 12 described above.

To bus line 428, HDD 402, operating unit 404, display unit 406, dedicated line connecting unit 408 and NIC 410 are further electrically connected.

HDD 402 stores various data including image data for displaying various images on display unit 406. HDD 402 stores PIN code and transaction statement data generated in bank server 22 in association with each other. The transaction statement data and PIN code are deleted when a delete signal requesting deletion of transaction statement data is received from digital multi-function peripheral 14.

Operating unit 404 is an input device including a keyboard and the like allowing various inputs and character inputs in accordance with an instruction of an administrator. Display unit 406 is a monitor implemented, for example, by a liquid crystal display, for displaying results of processing of Web server 24. Operating unit 404 and display unit 406 are connected to bus line 428 through an interface (not shown).

Dedicated line connecting unit 408 provides an interface with dedicated line 17. Web server 24 performs data communication with bank server 22 connected to dedicated line 17 through dedicated line connecting unit 408. NIC 410 provides an interface with an external network 26. Web server 24 performs data communication through NIC 410 with an external apparatus on external network 26 and an external apparatus such as digital multi-function peripheral 14 connected to in-store network 18. By way of example, receiving a second notification signal including the PIN code information input by the user and a transmission request signal requesting transmission of the corresponding transaction statement data from digital multi-function peripheral 14, Web server 24 reads the transaction statement data corresponding to the PIN code included in the second notification signal from HDD 402, and transmits the read transaction statement data through NIC 410 and external network 26 to digital multi-function peripheral 14 connected to in-store network 18. When an external apparatus on external network 26 or on in-store network 18 performs data communication with Web server 24, a log-in process and a log-out process to and from Web server 24 take place. Further, data communication between Web server 24 and the external apparatus is through secure communication with high security.

A power source (not shown) is connected to various parts of Web server 24, and electric power is supplied from the power source, whereby various parts of Web server 24 operate.

<Software Configuration>

[Banking Terminal 12]

The program for realizing the transaction statement printing process is activated when banking terminal 12 executes any of the various bank transactions.

Figure 6:
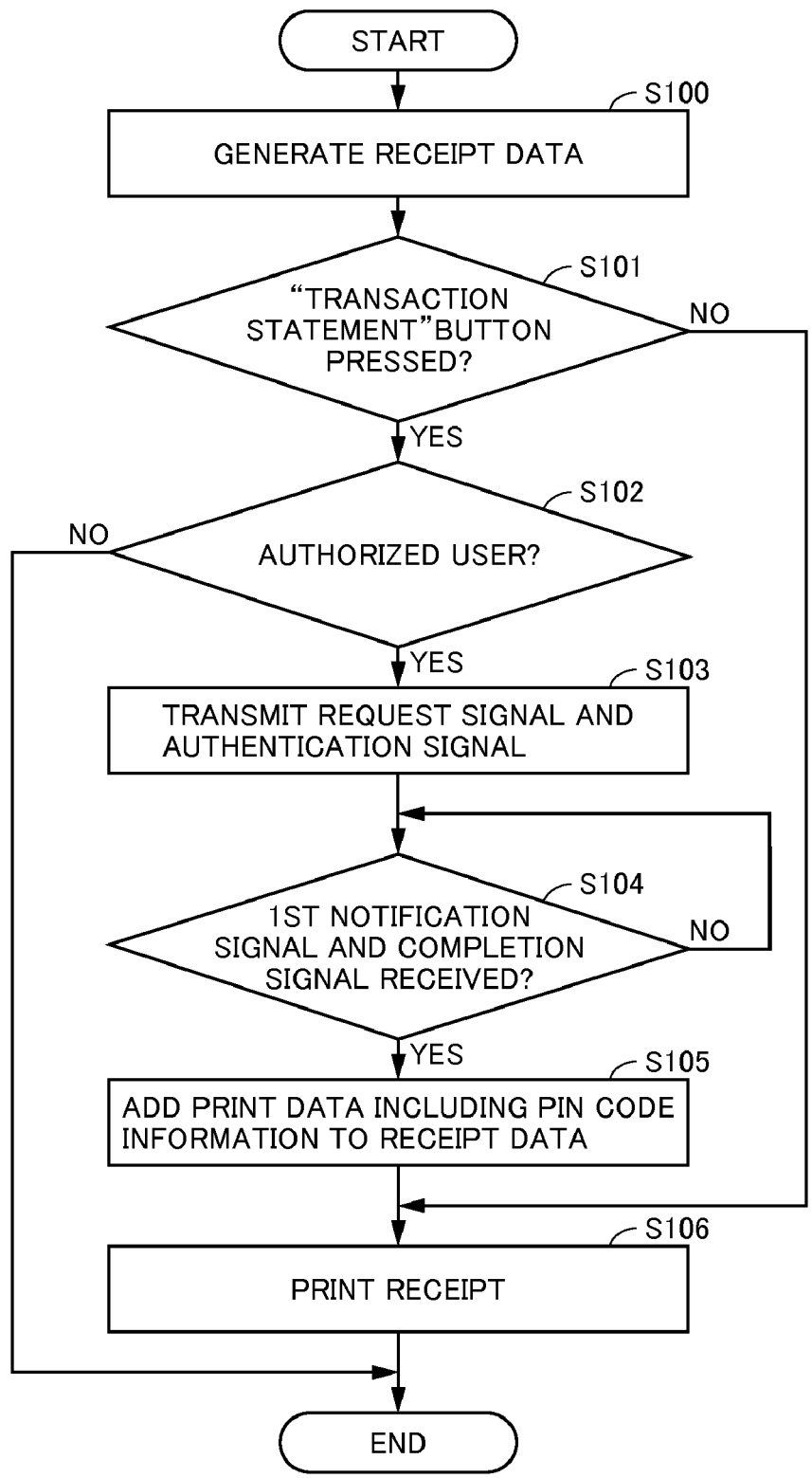
FIG. 6 is a flowchart representing a control structure of a program for realizing a receipt printing process.

Referring to FIG. 6, the program includes: a step S100 of causing receipt data generating unit 108 to generate the receipt data; a step S101 of determining whether or not the "transaction statement" button on the menu image displayed on operation panel 104 is pressed; a step S102, executed if it is determined at step S101 that the "transaction statement" button is pressed (YES), of performing the authentication process of looking up to the database stored in HDD 302 of bank server 22 and comparing the customer information read from the cash card with the personal identification number input by the user, and thereby determining whether or not the user is an authorized user.

The program further includes a step S103, executed if it is determined at step S102 that the user is an authorized user (YES), of transmitting the request signal and the authentication signal to bank server 22. If it is determined at step S102 that the user is not an authorized user (NO), the program ends.

The program further includes: a step S104 of waiting until a first notification signal and a completion signal are received from bank server 22; and a step S105, executed if it is determined at step S104 that the first notification signal and the completion signal are received (YES), of causing receipt data generating unit 108 to add the image data for printing including PIN code information included in the first notification signal to receipt data.

The program further includes a step S106, executed after the process of step S105, or executed if it is determined at step S101 that the "transaction statement" button is not pressed (NO), of causing receipt issuing unit 110 to print a receipt based on the receipt data.

[Bank Server 22]

The program for realizing the transaction statement data registration process is activated when bank server 22 is powered on, and terminated when it is powered off.

Figure 7:
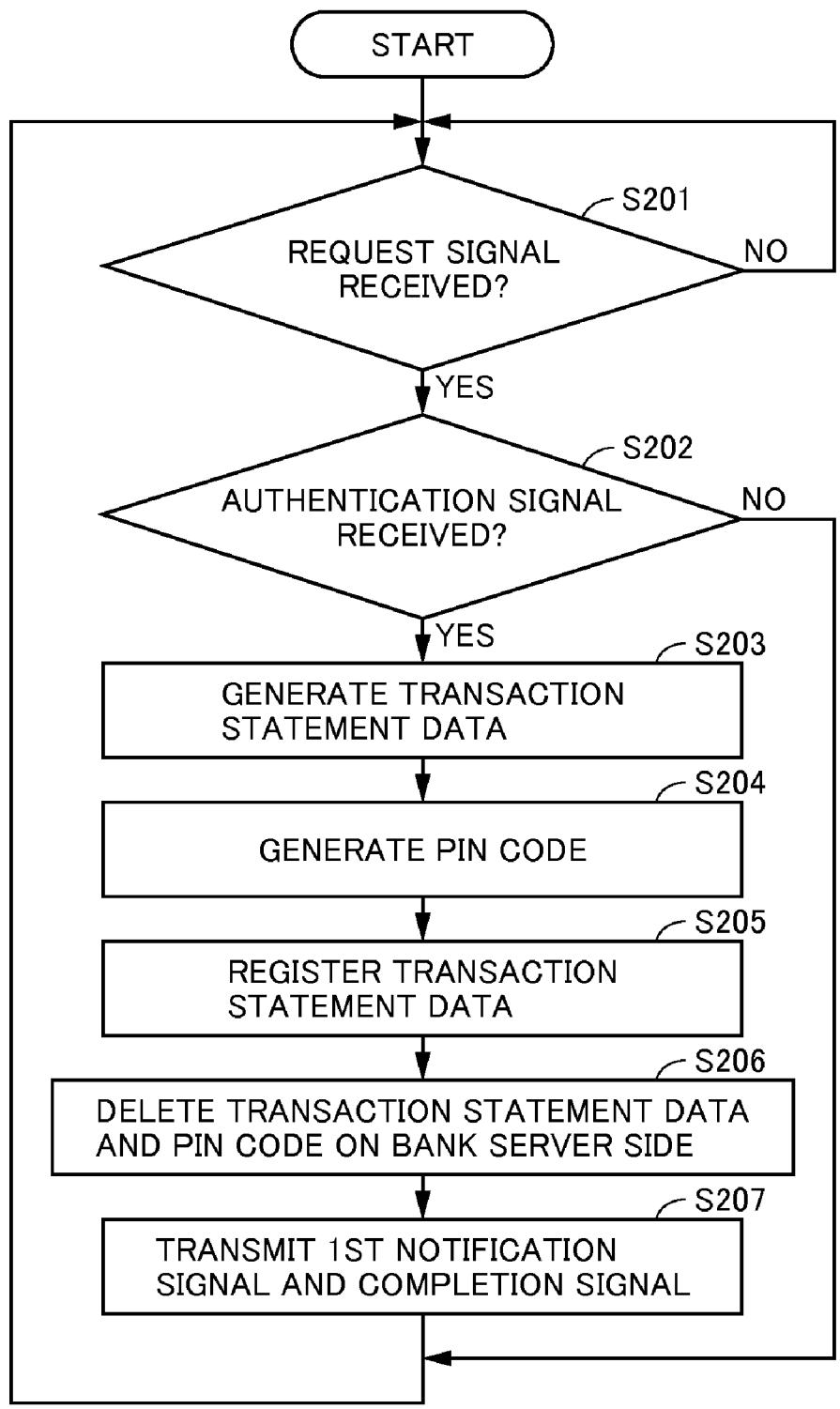
FIG. 7 is a flowchart representing a control structure of a program for realizing a transaction statement data registration process.

Referring to FIG. 7, the program includes: a step S201 of waiting until a request signal is received from banking terminal 12; and a step S202 executed if it is determined at step S201 that the request signal is received (YES), of determining whether or not an authentication signal is received.

The program further includes: a step S203, executed if it is determined at step S202 that the authentication signal is received (YES), of causing transaction statement data generating unit 312 to look up to the database stored in HDD 302 and to generate transaction statement data based on the transaction statement information of a desired period input from operation panel 104 of banking terminal 12; and a step S204 of causing PIN code generating unit 314 to generate the PIN code. If it is determined at step S202 that the authentication signal it not received (NO), the control returns to step S201.

The program further includes: a step S205 of storing the generated transaction statement data and the PIN code in association with each other in HDD 402 of Web server 24 and thereby registering the transaction statement data; and a step S206 of deleting the transaction statement data and the PIN code stored on the side of bank server 22.

The program further includes a step S207 of transmitting the first notification signal and the completion signal to banking terminal 12.

[Digital Multi-Function Peripheral 14]

The program for realizing the transaction statement printing process is activated when the "get transaction statement" button on the service menu image displayed on operation panel 208 is selected and the PIN code is input through operation panel 208.

Figure 8:
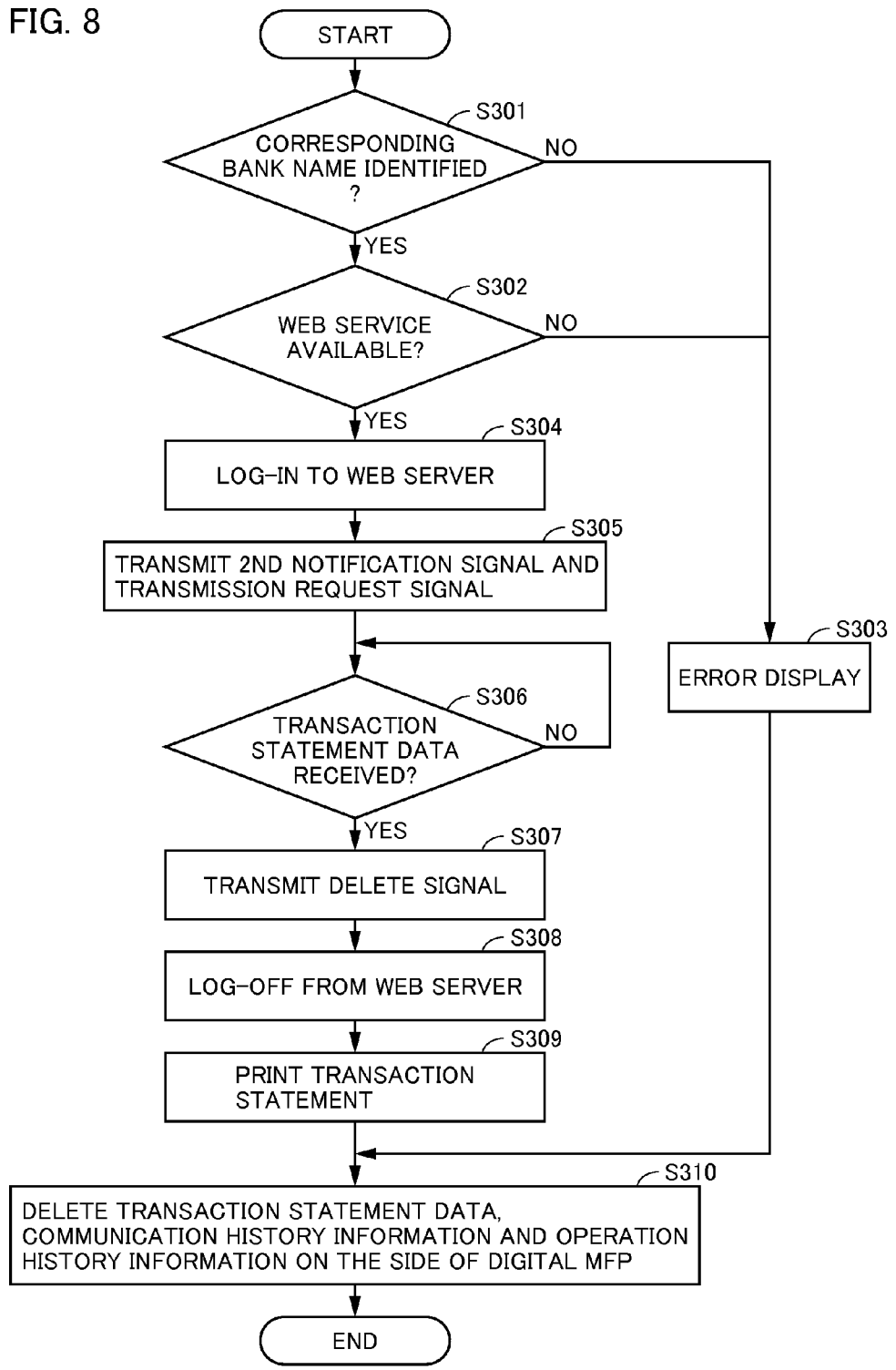
FIG. 8 is a flowchart representing a control structure of a program for realizing a transaction statement printing process.

Referring to FIG. 8, the program includes: a step S301 of determining, based on the data of banks list stored in HDD 246, whether or not the name of a partner bank corresponding to the identifier included in the input PIN code can be identified; and a step S302, executed if it is determined at step S301 that the corresponding bank name can be identified (YES), of determining, based on the data of banks list stored in HDD 246, whether or not the bank having the identified bank name is in a state ready to provide the Web service.

The program further includes: a step S303, executed if it is determined at step S301 that the corresponding bank name cannot be identified (NO), or if it is determined at step S302 that the Web service is not available (NO), of displaying an error display indicating that the transaction statement printing service is unavailable, on operation panel 208.

The program further includes: a step S304, executed if it is determined at step S302 that the Web service is available (YES), of logging-in to Web server 24; and a step S305 of transmitting the second notification signal and the transmission request signal to Web server 24.

The program further includes: a step S306 of waiting until corresponding transaction statement data is received from Web server 24; a step S307, executed if it is determined at step S306 that the transaction statement data is received (YES), of transmitting the deletion signal to Web server 24; and a step S308 of logging-off from Web server 24.

The program further includes: a step S309 of causing printer unit 206 to print a transaction statement based on the received transaction statement data; and a step S310 of deleting the transaction statement data, communication history information such as the date and time of transmission of the second notification signal and transmission request signal as well as the operation history information such as the input PIN code, stored on the side of digital multi-function peripheral 14. Here, the transaction statement data stored in image memory 248 or the like is erased, for example, by a method of overwriting with meaningless data. It is noted that step S310 is also executed after the process of step S303 and, at that time, the operation history information stored on the side of digital multi-function peripheral 14 is deleted.

<Operation>

Referring to FIGS. 1 to 8, when the user wishes to have a transaction statement, print system 1 operates in the following manner. It is noted that the operations of print system 1 are the same as the operations of a conventional common print system, except for the operation described in the following. Further, in the operation described below, it is assumed that banking terminal 12, digital multi-function peripheral 14, bank server 22 and Web server 24 are always kept powered-on.

The user goes to a nearest banking terminal 12, selects "withdrawal" button from various menu buttons on the menu image displayed on operation panel 104, presses "transaction statement" button, and inputs desired pieces of transaction information such as amount of transaction and the desired period of transaction statement through the touch panel. After inputting the transaction information, the user inserts a cash card through a card insertion slot of information reading/writing unit 106.

Control unit 100 of banking terminal 12 causes information reading/writing unit 106 to read customer information from the inserted cash card, and causes operation panel 104 to display a message urging input of personal identification number.

The user confirms the displayed message, and inputs the personal identification number through operation panel 104. When the personal identification number is input, control unit 100 performs the authentication process of looking up to the database stored in HDD 302 of bank server 22, comparing the customer information read from the cash card and the personal identification number, and thereby determining whether or not the user operating banking terminal 12 is an authorized user. Control unit 100 determines that the user is an authorized user, recognizes the selected menu button and the input transaction information, and executes the withdrawal process in accordance with the recognized information.

At this time, in synchronization with the withdrawal process, control unit 100 causes receipt data generating unit 108 to generate the receipt data (S100). Thereafter, determining that the "transaction statement" button has been pressed (YES at S101), it again performs the authentication process by looking up the database stored in HDD 302 of bank server 22 and comparing the customer information read from the cash card and the input personal identification number (S102).

Determining that the user is an authorized user (YES at S102), control unit 100 transmits the request signal and the authentication signal to bank server 22 (S103).

Determining that the request signal and the authentication signal are received (YES at S201 and S202), control unit 300 of bank server 22 causes transaction statement data generating unit 312 to generate the transaction statement data based on the transaction statement information of the desired period input through operation panel 104 of banking terminal 12, by looking up to the database stored in HDD 302 (S203), and causes PIN code generating unit 314 to generate the PIN code (S204).

Control unit 300 registers the transaction statement data by storing the generated transaction statement data and the PIN code in HDD 402 of Web server 24 in association with each other (S205), and thereafter, deletes the transaction statement data and the PIN code stored on the side of bank server 22 (S206).

After deleting the transaction statement data and the PIN code, control unit 300 transmits the first notification signal and the completion signal to banking terminal 12 (S207).

Determining that the first notification signal and the completion signal are received (YES at S104), control unit 100 of banking terminal 12 causes receipt data generating unit 108 to add image data for printing including the notified PIN code information to receipt data (S105).

After the data is added, control unit 100 causes receipt issuing unit 110 to print a receipt based on the receipt data (S106).

Receiving the receipt, the user selects "get transaction statement" button from various service menu buttons on the service menu image displayed on operation panel 208 of digital multi-function peripheral 14, and inputs the PIN code printed on the receipt through the touch panel.

Control unit 200 of digital multi-function peripheral 14 determines, based on the data of banks list stored in HDD 246, whether or not the name of partner bank corresponding to the identifier included in the input PIN code can be identified (S301). If it is determined that the corresponding bank name can be identified (YES at S301), it determines, based on the data of banks list stored in HDD 246, whether or not the bank having the identified bank name is in a state ready to provide the Web service (S302).

If the identified bank is in a state ready to provide the Web service (YES at S302), it logs-in to Web server 24 (S304), and transmits the second notification signal and the transmission request signal to Web server 24 (S305).

Receiving the second notification signal and the transmission request signal, Web server 24 reads the transaction statement data corresponding to the PIN code included in the second notification signal from HDD 402, and transmits the read transaction statement data to digital multi-function peripheral 14.

Receiving the corresponding transaction statement data from Web server 24 (YES at S306), control unit 200 of digital multi-function peripheral 14 transmits a deletion signal to Web server 24 (S307), and logs-off from Web server 24 (S308). Receiving the deletion signal, Web server 24 deletes the corresponding transaction statement data and the PIN code stored in HDD 402.

After log-off, control unit 200 causes printer unit 206 to print the transaction statement based on the received transaction statement data (S309), and deletes the transaction statement data, communication history information and operation history information stored on the side of digital multi-function peripheral 14 (S310).

If the corresponding bank name cannot be identified (NO at S301) or if the identified bank is not ready to provide Web service (NO at S302), control unit 200 causes operation panel 208 to display an error display indicating that the transaction statement printing service is unavailable (S303), and deletes the operation history information stored on the side of digital multi-function peripheral 14 (S310).

[Modification]

A modification of print system 1 has the same configuration as print system 1 in accordance with the above-described embodiment except that store identifying information is stored in HDD 102 of banking terminal 12 and HDD 246 of digital multi-function peripheral 14, that the transaction statement data, PIN code and the store identifying information are stored in association with each other in HDD 402 of Web server 24, that Web server 24 confirms the store identifying information, and that the program for realizing the receipt printing process, the transaction statement data registration process and the transaction statement printing process has a different control structure. In the present modification, components having the same functions as those of print system 1 are denoted by the same reference characters and same names, and detailed description thereof will not be repeated.

In the present modification, store identifying information is stored in each of HDD 102 of banking terminal 12 and HDD 246 of digital multi-function peripheral 14. The store identifying information refers to information for identifying and specifying a store 10 in which banking terminal 12 and digital multi-function peripheral 14 are installed.

HDD 402 of Web server 24 stores the transaction statement data and the PIN code generated by bank server 22 and the store identifying information included in a store identifying signal transmitted from banking terminal 12 in association with each other.

Receiving the second notification signal, the transmission request signal and the store identifying signal from digital multi-function peripheral 14, Web server 24 first reads the store identifying information corresponding to the PIN code included in the second notification signal from HDD 402, and determines whether or not the read store identifying information matches the store identifying information included in the received store identifying signal. If it is determined that these pieces of information match, the transaction statement data corresponding to the PIN code included in the second notification signal is read from HDD 402, and the read transaction statement data is transmitted to digital multi-function peripheral 14. If it is determined that these pieces of information do not match, reading and transmission of the transaction statement data do not take place.

<Software Configuration>

[Banking Terminal 12]

Figure 9:
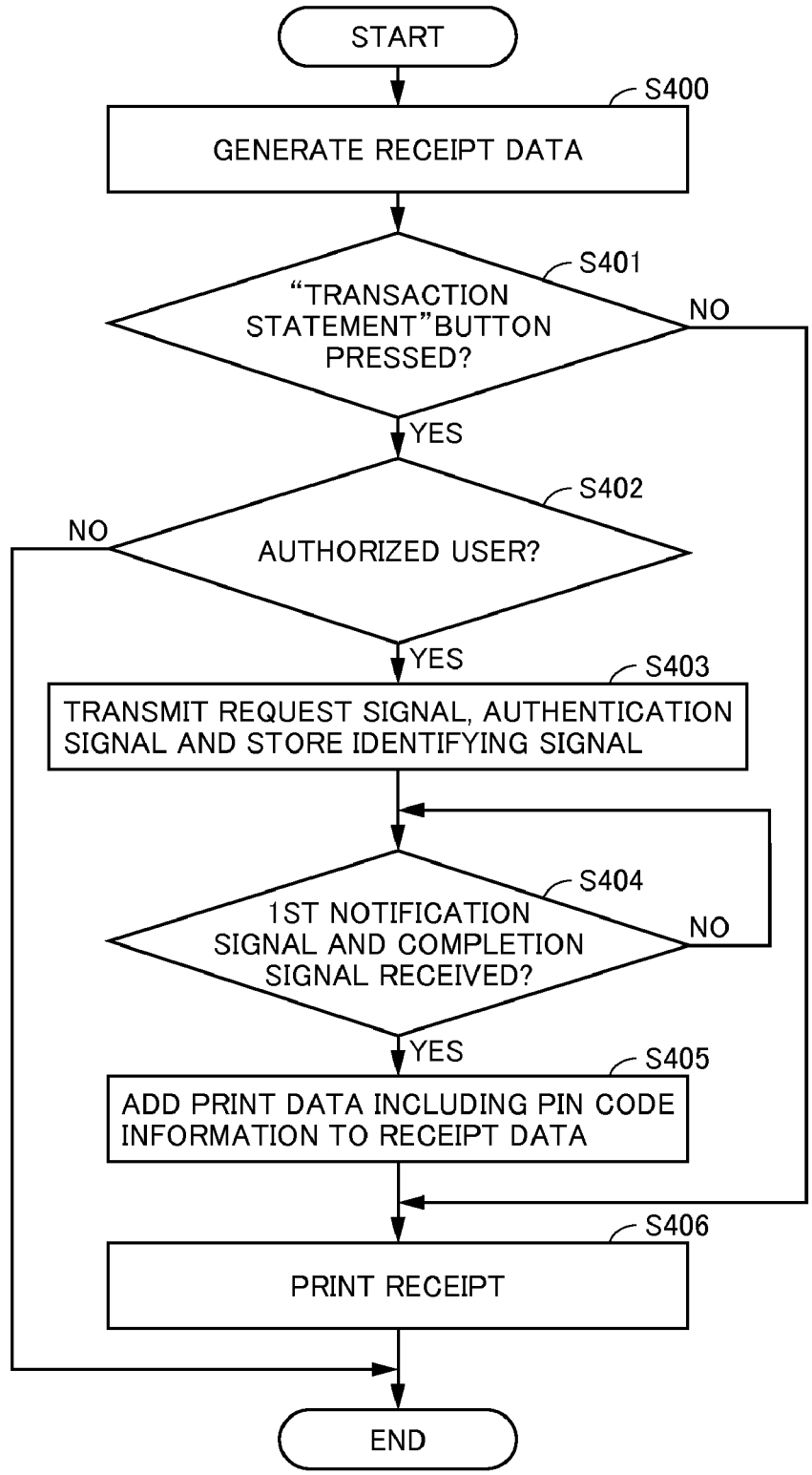
FIG. 9 is a flowchart representing a control structure of a program for realizing a receipt printing process in accordance with a modification.

Referring to FIG. 9, processes of steps S400 to S402 and steps S404 to S406 of the program for realizing the receipt printing process in accordance with the present modification are the same as the processes of steps S100 to S102 and S104 to S106 shown in FIG. 6. In the following, only the process of step S403 will be described.

The program includes a step S403, executed if it is determined at step S402 that the user is an authorized user (YES), of transmitting to bank server 22, the request signal and the authentication signal as well as the store identifying signal including the store identifying information stored in HDD 102.

[Bank Server 22]

Figure 10:
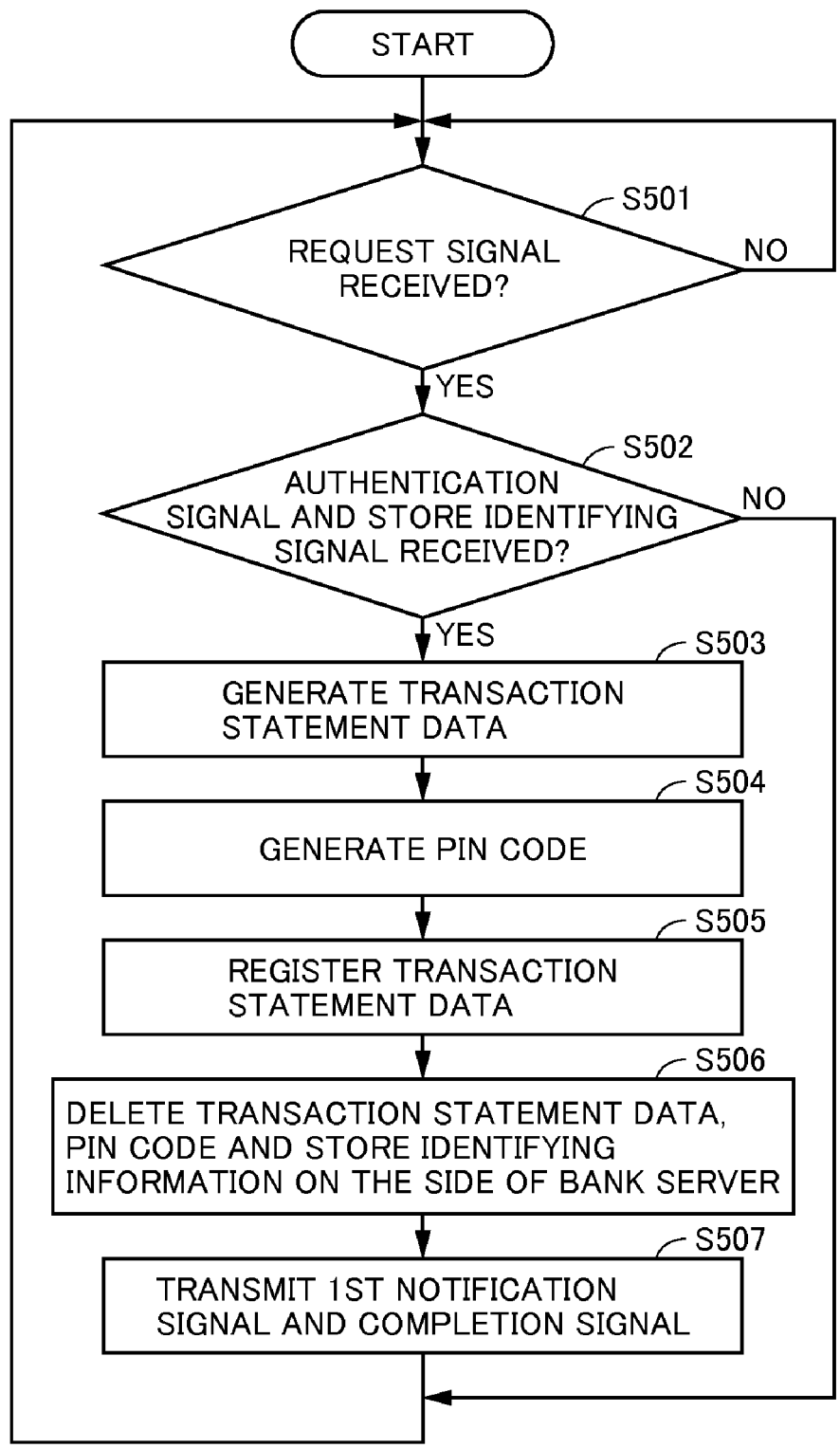
FIG. 10 is a flowchart representing a control structure of a program for realizing a transaction statement data registration process in accordance with a modification.

Referring to FIG. 10, the processes of steps S501, S503, S504 and S507 of the program for realizing the transaction statement data registration process in accordance with the present modification are the same as processes of steps S201, S203, S204 and S207 shown in FIG. 7. In the following, only the processes of steps S502, S505 and S506 will be described.

The program includes: a step S502, executed if it is determined at step S501 that the request signal has been received (YES), of determining whether or not the authentication signal and the store identifying signal are received; a step S505 of storing the generated transaction statement data, the PIN code and the store identifying information included in the store identifying signal in association with each other in HDD 402 of Web server 24, and thereby registering the transaction statement data; and a step S506 of deleting the transaction statement data, the PIN code and the store identifying information stored on the side of bank server 22.

[Digital Multi-Function Peripheral 14]

Referring to FIG. 11, the processes of steps S601 to 604 and steps S607 to S610 in the program for realizing the transaction statement printing process in accordance with the present modification are the same as the processes of steps S301 to S304 and S307 to S310 shown in FIG. 8. In the following, only the processes of steps S605 and S606 will be described.

The program includes: a step S605 of transmitting, together with the second notification signal and the transmission request signal, the store identifying signal including the store identifying information stored in HDD 246 to Web server 24; and a step S606 of determining whether or not the corresponding transaction statement data is received from Web server 24 in a certain predetermined time period. If it is determined at step S606 that the corresponding transaction statement data is received in a certain predetermined time period (YES), the control proceeds to step S607. If it is determined that the transaction statement data is not received in a certain predetermined time period (NO), the control proceeds to step S603.

<Operation>

Referring to FIGS. 1 to 5 and 9 to 11, when the user wishes to have a transaction statement, the modification of print system 1 operates in the following manner. It is noted that the operations of the modification of print system 1 are the same as the operations of a conventional common print system, except for the operation described in the following. Further, in the operation described below, it is assumed that banking terminal 12, digital multi-function peripheral 14, bank server 22 and Web server 24 are always kept powered-on.

The user goes to a nearest banking terminal 12, selects "withdrawal" button from various menu buttons on the menu image displayed on operation panel 104, presses "transaction statement" button, and inputs desired pieces of transaction information such as amount of transaction and the desired period of transaction statement through the touch panel. After inputting the transaction information, the user inserts a cash card through a card insertion slot of information reading/writing unit 106.

Control unit 100 of banking terminal 12 causes information reading/writing unit 106 to read customer information from the inserted cash card, and causes operation panel 104 to display a message urging input of personal identification number.

The user confirms the displayed message, and inputs the personal identification number through operation panel 104. When the personal identification number is input, control unit 100 performs the authentication process of looking up to the database stored in HDD 302 of bank server 22, comparing the customer information read from the cash card and the personal identification number, and thereby determining whether or not the user operating banking terminal 12 is an authorized user. Control unit 100 determines that the user is an authorized user, recognizes the selected menu button and the input transaction information, and executes the withdrawal process in accordance with the recognized information.

At this time, in synchronization with the withdrawal process, control unit 100 causes receipt data generating unit 108 to generate the receipt data (S400). Thereafter, determining that the "transaction statement" button has been pressed (YES at S401), it again performs the authentication process by looking up the database stored in HDD 302 of bank server 22 and comparing the customer information read from the cash card and the input personal identification number (S402).

Determining that the user is an authorized user (YES at S402), control unit 100 transmits the request signal, the authentication signal and the store identifying signal to bank server 22 (S403).

Determining that the request signal, the authentication signal and the store identifying signal are received (YES at S501 and S502), control unit 300 of bank server 22 causes transaction statement data generating unit 312 to generate the transaction statement data based on the transaction statement information of the desired period input through operation panel 104 of banking terminal 12, by looking up to the database stored in HDD 302 (S503), and causes PIN code generating unit 314 to generate the PIN code (S504).

Control unit 300 registers the transaction statement data by storing the generated transaction statement data, the PIN code and the store identifying information in HDD 402 of Web server 24 in association with each other (S505), and thereafter, deletes the transaction statement data, the PIN code and the store identifying information stored on the side of bank server 22 (S506).

After deleting the transaction statement data, the PIN code and the store identifying information, control unit 300 transmits the first notification signal and the completion signal to banking terminal 12 (S507).

Determining that the first notification signal and the completion signal are received (YES at S404), control unit 100 of banking terminal 12 causes receipt data generating unit 108 to add image data for printing including the notified PIN code information to receipt data (S405).

After the data is added, control unit 100 causes receipt issuing unit 110 to print a receipt based on the receipt data (S406).

Receiving the receipt, the user selects "get transaction statement" button from various service menu buttons on the service menu image displayed on operation panel 208 of digital multi-function peripheral 14, and inputs the PIN code printed on the receipt through the touch panel.

Control unit 200 of digital multi-function peripheral 14 determines, based on the data of banks list stored in HDD 246, whether or not the name of partner bank corresponding to the identifier included in the input PIN code can be identified (S601). If it is determined that the corresponding bank name can be identified (YES at S601), it determines, based on the data of banks list stored in HDD 246, whether or not the bank having the identified bank name is in a state ready to provide the Web service (S602).

If the identified bank is in a state ready to provide the Web service (YES at S602), it logs-in to Web server 24 (S604), and transmits the second notification signal, the transmission request signal and the store identification signal to Web server 24 (S605).

Receiving the second notification signal, the transmission request signal and the store identifying signal, Web server 24 first reads the store identifying information corresponding to the PIN code included in the second notification signal from HDD 402, and determines whether the read store identifying information matches the store identifying information included in the received store identifying signal. If it is determined that the pieces of information match, Web server 24 reads the transaction statement data corresponding to the PIN code included in the second notification signal from HDD 402, and transmits the read transaction statement data to digital multi-function peripheral 14. It it is determined that these pieces of information do not match, reading and transmission of transaction statement data do not take place.

Receiving the corresponding transaction statement data from Web server 24 within a certain predetermined time period (YES at S606), control unit 200 of digital multi-function peripheral 14 transmits a deletion signal to Web server 24 (S607), and logs-off from Web server 24 (S608). Receiving the deletion signal, Web server 24 deletes the corresponding transaction statement data, the PIN code and the store identifying information stored in HDD 402.

After log-off, control unit 200 causes printer unit 206 to print the transaction statement based on the received transaction statement data (S609), and deletes the transaction statement data, communication history information and operation history information stored on the side of digital multi-function peripheral 14 (S610).

If the corresponding bank name cannot be identified (NO at S601), if the identified bank is not ready to provide Web service (NO at S602), or if the transaction statement data is not received within a certain predetermined time period (NO at S606), control unit 200 causes operation panel 208 to display an error display indicating that the transaction statement printing service is unavailable (S603), and deletes the operation history information stored on the side of digital multi-function peripheral 14 (S610).

<Function/Effects>

According to the embodiment and modification described above, print system 1 includes: banking terminal 12; and a digital multi-function peripheral 14 performing data communication with Web server 24 storing PIN code and transaction statement data representing bank transaction history information with a prescribed bank 20 associated with each other, through external network 26 and in-store network 18. Banking terminal 12 includes a "transaction statement" button on operation panel 104 for receiving a user request to output a transaction statement, and PIN code generating unit 314 and receipt issuing unit 110 for generating and outputting a PIN code in response to the received request. Digital multi-function peripheral 14 includes operation panel 208 receiving the PIN code input by the user operation, control unit 200 obtaining the transaction statement data corresponding to the received PIN code from Web server 24, and printer unit 206 outputting the transaction statement based on the obtained transaction statement data.

As described above, it is possible for the user to obtain the desired transaction statement by inputting the PIN code output from banking terminal 12 to digital multi-function peripheral 14. Since only the user who obtained the PIN code can obtain the transaction statement, it is possible to prevent a third party from obtaining the transaction statement, and hence, to prevent leakage of individual information. The user can obtain the transaction statement in a safe and easy manner.

According to the embodiment and modification described above, banking terminal 12 further includes control unit 100 performing an authentication process of determining whether or not the user is an authorized user, and PIN code generating unit 314 and receipt issuing unit 110 generate and output the PIN code when it is determined by control unit 100 that the user is an authorized user. This prevents a third party, who is not an authorized user, from obtaining the PIN code. Thus, leakage of individual information can reliably be prevented.

According to the embodiment and modification described above, PIN code generating unit 314 generates the PIN code to include an identifier for identifying a partner bank 20. Thus, it becomes easier for digital multi-function peripheral 14 to obtain the transaction statement data corresponding to the PIN code input by the user.

Further, according to the embodiment and modification described above, control unit 200 of digital multi-function peripheral 14 further includes the function of confirming, at every predetermined time interval, the provision information indicating whether or not the transaction statement data presented by Web server 24 is available, and the function of updating the provision information of banks list data stored in HDD 246 based on the confirmed result. Therefore, it becomes possible on the side of digital multi-function peripheral 14 to confirm that Web server 24 is not ready to provide the transaction statement data and, hence, wasteful communication can be prevented.

According to the embodiment and modification described above, control unit 200 of digital multi-function peripheral 14 further includes the function of prohibiting data communication with Web server 24 by causing, when information representing that Web server 24 is not ready to provide the transaction statement data is to be presented, operation panel 208 to display an error display indicating that the transaction statement printing service is unavailable. Thus, wasteful communication can more reliably be prevented. The method of prohibiting data communication with Web server 24 is not limited to the above. By way of example, log-in to the corresponding Web server 24 may be rejected, or a bank name in which the corresponding Web server 24 is installed may not be displayed on operation panel 208, so as not to allow selection by the user.

Further, according to the embodiment and modification described above, after outputting the transaction statement, control unit 200 of digital multi-function peripheral 14 deletes the obtained transaction statement data, communication history information and operation history information. This prevents the transaction statement data, the communication history information and the operation history information from being kept stored, and hence, leakage of individual information can more reliably be prevented. Further, at this time, it is preferred to have a message that these data are deleted displayed on operation panel 208. Seeing such a message, the user feels secure that the individual information will not be leaked and, he/she is more at ease in operation.

According to the modification described above, if the transaction statement data is not received in a certain predetermined time period, control unit 200 of digital multi-function peripheral 14 causes operation panel 208 to display an error display that the transaction statement printing service is unavailable, and thereafter, deletes the operation history information stored on the side of digital multi-function peripheral 14. Specifically, if a certain predetermined time period passes after operation panel 104 of banking terminal 12 received a request for outputting the transaction statement, printing of the transaction statement by printer unit 206 is prohibited. Since a time limit is set for the output of transaction statement, it becomes possible to more reliably prevent a third party from obtaining the transaction statement. Thus, leakage of individual information can more reliably be prevented. The time limit may be set in a manner different from above. By way of example, printing may be prohibited if a certain predetermined time period passes after the end of prescribed banking transaction on banking terminal 12.

Further, according to the modification described above, HDD 102 of banking terminal 12 stores the store identifying information identifying the store 10 in which banking terminal 12 is installed, and HDD 246 of digital multi-function peripheral 14 stores the store identifying information identifying the store 10 in which digital multi-function peripheral 14 is installed. Web server 24 transmits the transaction statement data corresponding to the received PIN code to digital multi-function peripheral 14 only when the pieces of store identifying information match. Thus, the transaction statement data can surely be protected, and leakage of individual information can more reliably be prevented.

In the embodiment and modification described above, an arrangement for preventing the user from leaving behind the receipt is not provided on banking terminal 12. Such an arrangement may be preferred. An exemplary arrangement to prevent careless leaving of the receipt may include a first detecting unit (not shown) provided on receipt issuing unit 110 or the like for detecting whether or not the receipt is taken away, and an alarm unit for setting off an alarm if it is detected by the first detecting unit that the receipt is not taken. The alarm unit may be operation panel 208 on which an alarm message that the receipt is not taken is displayed, or a speaker (not shown) sounding the alarm. This more reliably prevents the user from carelessly leaving the receipt behind. As a result, it becomes possible to more reliably prevent a third party from obtaining the transaction statement. Thus, leakage of individual information can more reliably be prevented.

Further, in addition to the first detecting unit and the alarm unit described above, banking terminal 12 may have a configuration including a retracting unit (not shown) retracting the receipt to a predetermined storage area (not shown) in a manner as described in the following, when a certain predetermined time passes after issuing the receipt and it is detected by the first detecting unit that the receipt is not taken but left behind. Specifically, the retracting unit regulates a driving unit such that roller paper rotates in a reverse direction, so that the receipt is fed through a feeding path different from the feeding path used at the time of output, and stored in the storage area provided inside the banking terminal 12. Since the retracting unit as such is provided, it becomes possible to more reliably prevent a third party from obtaining the transaction statement. Thus, leakage of individual information can more reliably be prevented.

Further, in addition to the retracting unit described above, banking terminal 12 may include a second detecting unit for detecting the amount of receipts stored in the storage area. If it is detected by the second detecting unit that the storage area is full of receipts, operation panel 104 may reject a request for outputting the transaction statement. Here, it is preferred that a message that the transaction statement printing service is unavailable is displayed on operation panel 104. This prevents any trouble in banking terminal 12 and, hence, it is more convenient for the user.

Further, if an error occurs in banking terminal 12, for example, if it is detected by the second detecting unit that the storage area is full of receipts, control unit 100 of banking terminal 12 may notify the administrator of banking terminal 12 of the occurrence of error. The method of notifying the error is not specifically limited, and any common method in the field of art may be used. By way of example, a message of error may be displayed on operation panel 104, or an electronic mail including a message of error may be transmitted to a PC used by the administrator. Since occurrence of error is notified, the administrator can more quickly handle the error. Thus, the time period in which banking terminal 12 is stopped because of a trouble can be reduced.

Though the PIN code includes an identifier in the embodiment and modification described above, the present invention is not limited to such an embodiment. For instance, in addition to the identifier mentioned above, a number known to the user but difficult for a third party to confirm may be included, such as the account number indicated on the cash card. Here, receipt issuing unit 110 outputs the receipt with the portion corresponding to the number hidden, for example, by replacing the number with a series of asterisks M. Therefore, even if the user loses the receipt before obtaining the transaction statement, the third party cannot utilize the PIN code, and hence he/she cannot obtain the transaction statement. Thus, leakage of individual information can more reliably be prevented.

Further, in the embodiment and modification described above, control unit 400 of Web server 24 deletes the transaction statement data and the PIN code from HDD 402, after transmitting the transaction statement data to digital multi-function peripheral 14 and receiving the delete signal from the digital multi-function peripheral 14. The present invention, however, is not limited to such an embodiment. For instance, after registration of transaction statement data, if the transmission request signal from an external apparatus such as digital multi-function peripheral 14 is not received within a certain predetermined time period, the data may be automatically deleted. By such an approach, it is possible to prevent the transaction statement data and the PIN code from being left stored even when the user does not request output of transaction statement. Thus, leakage of individual information can more reliably be prevented.

Further, after the transaction statement data is transmitted to digital multi-function peripheral 14, the data may be automatically deleted. Thus, leakage of individual information can more reliably be prevented.

Further, in the embodiment and modification described above, receipt issuing unit 110 outputs a receipt having the result of transaction and the PIN code printed on it. The present invention, however, is not limited to such an embodiment. By way of example, a receipt having address information of Web server 24 such as the URL (Uniform Resource Locator) of Web server 24, by which transaction statement data is registered, printed in addition to the result of transaction and the PIN code, may be output. By such an approach, it becomes easier for the user to obtain the transaction statement data corresponding to the input PIN code. Further, since the user can obtain the receipt on which the address of Web server 24 is printed, it becomes possible for the user to log-in to Web server 24 from a PC (Personal Computer) or the like of his/her home utilizing Web service such as the Internet banking service, and by inputting the PIN code, to view the transaction statement. This allows the user to obtain the transaction statement not by using digital multi-function peripheral 14 and hence, it is more convenient for the user.

Further, in the embodiment and modification described above, digital multi-function peripheral 14 identifies, based on the identifier included in the PIN code, a corresponding bank name. The present invention, however, is not limited to such an embodiment. By way of example, the names of all partner banks included in the banks list data may be displayed on operation panel 208 of digital multi-function peripheral 14, and the user may select the intended bank name to identify the bank name. In that case, the PIN code may not include any identifier.

Further, in the embodiment and modification described above, the PIN code is recorded on the receipt printed by banking terminal 12. The present invention, however, is not limited to such an embodiment. By way of example, the PIN code may be displayed on operation panel 104 of banking terminal 12. In that case, the user obtains the PIN code by a desired method, for example, he/she memorizes or writes down the displayed PIN code, and inputs the obtained PIN code through operation panel 208 of digital multi-function peripheral 14. Since the PIN code is displayed in this manner, it becomes possible to prevent a third party from obtaining the PIN code from inadvertently lost receipt. Thus, leakage of individual information can more reliably be prevented.

Alternatively, the PIN code may be written to the cash card inserted to the card insertion slot, by information reading/writing unit 106 of banking terminal 12. In that case, digital multi-function peripheral 14 is provided with a card reader (not shown) with a card insertion slot, and the user inserts the cash card having the PIN code written therein to the card insertion slot, whereby the PIN code is input to digital multi-function peripheral 14. The card reader reads the PIN code from the inserted cash card, and outputs the read PIN code to control unit 200. By way of example, if the cash card is an IC card, information reading/writing unit 106 is an IC card reader/writer, and the card reader mentioned above is an IC card reader. Since exchange of PIN code is performed through the use of a cash card, visual recognition of the PIN code by a third party can be prevented. Thus, leakage of individual information can more reliably be prevented.

Further, in the embodiment and modification described above, deletion of data such as the transaction statement data on the side of digital multi-function peripheral 14 is executed by control unit 200. The present invention, however, is not limited to such an embodiment. By way of example, digital multi-function peripheral 14 may be provided with a mounting unit (not shown) on which a data security kit is detachably mounted, and the data may be automatically deleted by the data security kit mounted on the mounting unit. The data security kit automatically executes erasure of processed data and encryption of not-yet processed data, to protect the data stored in digital multi-function peripheral 14 from unauthorized access.

Alternatively, control unit 200 of digital multi-function peripheral 14 may determine whether or not the data security kit is mounted on the mounting unit, and if it is determined that the kit is not mounted, it may prohibit printing of transaction statement by printer unit 206. By such an approach, output of transaction statement with the data in an unprotected state can be prevented, and a third party cannot obtain the data such as the transaction statement data, after printing of the transaction statement. Thus, leakage of individual information can more reliably be prevented.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A print system, comprising a dedicated automated teller machine (ATM) in communication with a banking server, and an output apparatus configured to perform data communication through a network with a web server storing a PIN code and transaction statement data, the print system comprising:
   said dedicated ATM, which includes
      a first receiving unit configured to receive a request by a user for an output of a transaction statement indicating financial transaction history information with a prescribed financial institution, and
      a first output unit responsive to said received request for generating and outputting said PIN code and an identifier for identifying a financial institution as a partner; and
   said output apparatus, which includes
      a second receiving unit configured to receive said PIN code input by an operation by said user,
      a data obtaining unit configured to obtain, from said web server, said transaction statement data corresponding to said received PIN code,
      a second output unit configured to output said transaction statement based on said obtained transaction statement data,
      a memory configured to store a list of identifiers and partner banks,
      a confirming unit configured to confirm, at every certain predetermined time interval, information presented by said web server indicating whether or not the web server is in a state ready to provide said transaction statement data, and a memory configured to store said confirmed information.

2. The print system according to claim 1, wherein
   said dedicated ATM further includes an authentication unit configured to perform an authentication process for determining whether or not the user is an authorized user; and
   said first output unit is configured to generate and output said PIN code when the user is determined to be an authorized user by said authentication unit.

3. The print system according to claim 1, wherein said first output unit is configured to output address information of said web server together with said PIN code.

4. The print system according to claim 1, wherein said output apparatus further includes a communication prohibiting unit configured to prohibit data communication with said external apparatus, when said external apparatus presents information indicating that the apparatus is in a state not ready to provide said transaction statement data.

5. The print system according to claim 1, wherein
said first output unit includes a recording medium output unit configured to output a recording medium having said PIN code recorded thereon; and
said dedicated ATM further includes
a first detecting unit configured to detect whether or not said recording medium is taken out, and
an alarm unit configured to set off an alarm when it is detected by said first detecting unit that said recording medium is not taken out.

6. The print system according to claim 5, wherein said dedicated ATM further includes a retracting unit configured to retract said recording medium to a predetermined storage area, if a certain predetermined time period passes after output of said recording medium and it is detected by said first detecting unit that said recording medium is not taken out.

7. The print system according to claim 6, wherein said dedicated ATM further includes:
a second detecting unit configured to detect an amount of said recording medium stored in said storage area; and
said first receiving unit includes a reception inhibiting unit configured to inhibit reception of a request for an output of a transaction statement, if it is detected by said second detecting unit that said storage area is full of said recording medium.

8. The print system according to claim 7, wherein said dedicated ATM further includes an error notification unit configured to notify an administrator of said financial service terminal of an error, if it is detected by said second detecting unit that said storage area is full of said recording medium.

9. The print system according to claim 1, wherein said output apparatus further includes a unit deleting configured to delete, after outputting said transaction statement, said obtained transaction statement data and operation history information including said input PIN code.

10. The print system according to claim 1, wherein said first output unit is configured to generate said PIN code to include a number known to the user and difficult for a third party to confirm, and outputs said PIN code with a portion corresponding to said number being hidden.

11. The print system according to claim 1, wherein said output apparatus further includes a prohibiting unit configured to prohibit output of said transaction statement by said second output unit, when a certain predetermined time passes after said first receiving unit received a request for an output of said transaction statement.

12. The print system according to claim 1, wherein said output apparatus further includes:
a mounting unit on which a data protection device for protecting data is detachably mounted,
a determining unit configured to determine whether or not said data protection device is mounted on said mounting unit, and
an output prohibiting unit configured to prohibit output of said transaction statement by said second output unit, when it is determined by said determining unit that said data protection device is not mounted on said mounting unit.

13. The print system according to claim 1, wherein
said dedicated ATM further includes a first store storage unit configured to store first store identifying information identifying a store in which said dedicated ATM is installed;
said output apparatus further includes a second store storage unit configured to store second store identifying information identifying a store in which said output apparatus is installed; and
said data obtaining unit is configured to obtain said transaction statement data corresponding to said received PIN code from said external apparatus, only when said first store identifying information matches said second store identifying information.

* * * * *